(12) United States Patent
Wild et al.

(10) Patent No.: US 10,768,709 B2
(45) Date of Patent: Sep. 8, 2020

(54) DISPLAY OPERATOR CONTROL UNIT AND METHOD FOR DISPLAYING ADDITIONAL INSTRUCTIONS ON A DISPLAY UNIT

(71) Applicant: VOLKSWAGEN AG, Wolfsburg (DE)

(72) Inventors: Holger Wild, Berlin (DE); Mark Peter Czelnik, Wolfsburg (DE)

(73) Assignee: VOLKSWAGEN AG, Wolfsburg (DE)

( * ) Notice: Subject to any disclaimer, the term of this patent is extended or adjusted under 35 U.S.C. 154(b) by 288 days.

(21) Appl. No.: 15/107,789

(22) PCT Filed: Dec. 10, 2014

(86) PCT No.: PCT/EP2014/077176
§ 371 (c)(1),
(2) Date: Jun. 23, 2016

(87) PCT Pub. No.: WO2015/101467
PCT Pub. Date: Jul. 9, 2015

(65) Prior Publication Data
US 2016/0320848 A1 Nov. 3, 2016

(30) Foreign Application Priority Data

Jan. 6, 2014 (DE) .......................... 10 2014 200 024

(51) Int. Cl.
*G06F 3/048* (2013.01)
*G06F 3/01* (2006.01)
(Continued)

(52) U.S. Cl.
CPC .............. *G06F 3/017* (2013.01); *B60K 37/06* (2013.01); *G06F 3/0482* (2013.01);
(Continued)

(58) Field of Classification Search
CPC .......... G06F 3/048; G06F 3/017; G06F 3/167; B60K 37/06; G09G 5/003
See application file for complete search history.

(56) References Cited

U.S. PATENT DOCUMENTS

2009/0077504 A1* 3/2009 Bell ........................ G06F 3/011
715/863
2010/0302179 A1 12/2010 Ahn et al.
(Continued)

FOREIGN PATENT DOCUMENTS

DE 112004001470 T5 6/2006
DE 102006037156 A1 9/2007
(Continued)

OTHER PUBLICATIONS

Search Report for German Patent Application No. 10 2014 200 024.6; dated Oct. 16, 2014.
(Continued)

*Primary Examiner* — Xuyang Xia
(74) *Attorney, Agent, or Firm* — Barnes & Thornburg LLP

(57) ABSTRACT

A display operator control unit, a propulsion means, and a method for displaying additional instructions relating to display elements displayed on a display unit. The method detects an input in a first input region in front of the display unit and, in response thereto, outputs a first instruction relating to a first display element and a second instruction relating to a second display element. The method also detects an input in a second input region in front of the display unit and, in response thereto, suppresses the second instruction relating to the second display element.

19 Claims, 5 Drawing Sheets

(51) Int. Cl.
  *B60K 37/06* (2006.01)
  *G06F 3/0482* (2013.01)
  *G06F 3/0488* (2013.01)
  *G06F 3/16* (2006.01)
  *G09G 5/00* (2006.01)
(52) U.S. Cl.
  CPC .......... *G06F 3/04883* (2013.01); *G06F 3/167* (2013.01); *G09G 5/003* (2013.01); *B60K 2370/141* (2019.05); *G09G 2380/10* (2013.01)

(56) References Cited

U.S. PATENT DOCUMENTS

| | | | | |
|---|---|---|---|---|
| 2014/0078044 | A1* | 3/2014 | Yamashita | B60K 35/00 345/156 |
| 2014/0096069 | A1* | 4/2014 | Boblett | G06F 3/017 715/783 |
| 2014/0309875 | A1* | 10/2014 | Ricci | H04W 4/21 701/36 |
| 2015/0067574 | A1* | 3/2015 | Okita | G06F 3/0488 715/773 |
| 2015/0130743 | A1* | 5/2015 | Li | G06F 3/044 345/174 |

FOREIGN PATENT DOCUMENTS

| | | |
|---|---|---|
| DE | 102008019731 A1 | 10/2009 |
| DE | 102009036369 A1 | 2/2011 |
| DE | 102009037104 A1 | 2/2011 |
| EP | 2121372 A1 | 11/2009 |

OTHER PUBLICATIONS

Search Report for International Patent Application No. PCT/EP2014/077176; dated Mar. 11, 2015.

* cited by examiner

DISPLAY OPERATOR CONTROL UNIT AND METHOD FOR DISPLAYING ADDITIONAL INSTRUCTIONS ON A DISPLAY UNIT

PRIORITY CLAIM

This patent application is a U.S. National Phase of International Patent Application No. PCT/EP2014/077176, filed 10 Dec. 2014, which claims priority to German Patent Application No. 10 2014 200 024.6, filed 6 Jan. 2014, the disclosures of which are incorporated herein by reference in their entirety.

SUMMARY

Illustrative embodiments relate to a display control unit for a locomotion device and to a method for displaying additional indications relating to display elements displayed on a display control unit. Disclosed embodiments relate to user guidance in the course of operation using gestures in regions having no contact with a display unit.

BRIEF DESCRIPTION OF THE DRAWINGS

Exemplary embodiments will be described in detail in the following with reference to the accompanying drawings. In the drawings.

DETAILED DESCRIPTION OF THE DISCLOSED EMBODIMENTS

Figure 1:
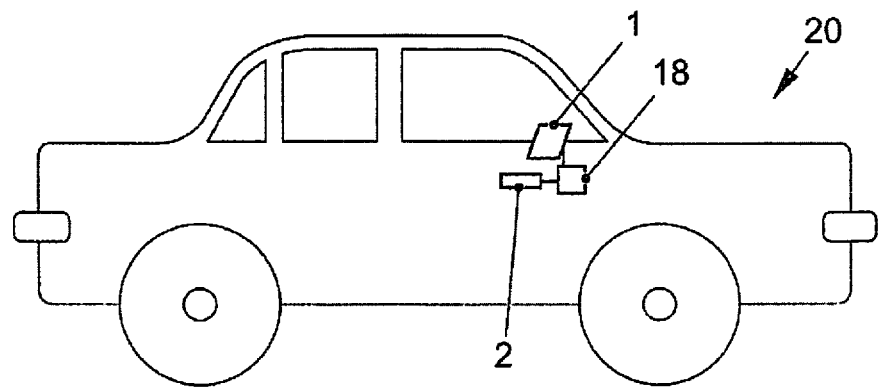
FIG. 1 is a schematic view of a of a locomotion device according to an exemplary embodiment.

Control concepts for operating human/machine interfaces (HMI) with screens are known in the state of the art. In current realizations, approaches of an object used an a implement for screen input (for example, a finger of a user) are also detected, and indications relating to operation are output. New sensor electronics partition the display into regions and highlight only the regions that are relevant/desired for the user. For the purpose of detecting the input implement, infrared sensors and camera-based sensors, for example, come into operation.

EP 2 121 372 B1 discloses activation volumes that are arranged in front of a display area, and the possibility to change an operating mode by virtue of presence in one of the activation volumes. A differentiation of a control operation from the position of a driver and from the position of a front-seat passenger is also described.

The arrangements and systems known in the state of the art do not satisfactorily exhaust the physical possibilities in connection with the assistance of a user. Disclosed embodiments satisfy the aforementioned requirements.

Disclosed embodiments provide a method for displaying additional indications and also by a display control unit and a locomotion device. The disclosed method is suitable to display additional indications relating to display elements displayed on a display unit. The display elements can be represented in a software-based manner on a screen by way of display unit. In the state of the art, such display elements are also designated as "tiles". The additional indications serve temporarily for additional information for a user of the display unit. In other words, in accordance with the disclosed embodiments the indications/information contained on the display elements are/is overlaid or masked out by the additional indications, depending on a user interaction. Firstly, for this purpose, an input implement in a first input region in front of the display unit is detected. The input implement may be, for example, a finger of a user, a stylus or similar. In accordance with the disclosed embodiments, the first input region is located in front of the display unit, by which a volume is described, the boundary surfaces of which do not coincide with a surface of the display unit. In response to a detection of the input implement, a first additional indication relating to the first display element and a second additional indication relating to a second display element are displayed. For example, the additional indications modify the representation of the display elements or constitute additional visual information superimposed on the display elements. Subsequently an input implement is detected in a second input region in front of the display unit. The second input region also represents a volume which is enclosed by boundary surfaces that do not coincide with a surface of the display unit. However, a boundary surface of the first input region and a boundary surface of the second input region may be identical, as a result of which the input regions adjoin one another directly. The second input region may be reached only in the course of a further approach to the display unit of the input implement coming from the first input region. In response to the detection of the input implement in the second input region, the second indication is removed to the second display element, the first indication continuing to be displayed. This can be induced, for example, by the input implement being guided in the direction of the first display element but not in the direction of the second display element. By virtue of the second indication being masked out, it is made clear to the user which display element his/her current input relates to. While undertaking a driving task the user can be advised in a suitable manner of the consequences of his/her interaction with the vehicle.

The first input region and the second input region may each be arranged in such a manner that their boundary surfaces oriented in the direction of the display unit are oriented substantially parallel to the surface of the display unit. Such an orientation is particularly easy to comprehend for a user, and the control operation is correspondingly easy to learn. Through the use of two input regions which are located in front of the display unit, a contact with the display unit may already represent a third input, by which a selection or confirmation, for example, of the first display element can be undertaken. This selection is undertaken when contact is reached with the surface of the display unit (spacing from the display unit=0 mm), which is also designated as a pressure-sensitive surface (touch-screen). In this way, by a single movement ("gesture"), several interactions are performed which prepare for a final interaction, namely the selection or confirmation of a button. The method is consequently suitable to make the control operation more efficient and more intuitive.

The first indication and/or the second indication may comprise a display of a symbol and/or of a text. Additionally or alternatively, the first indication and/or the second indication may comprise a voice output which informs the user of the functions assigned to the display elements.

In the case where use is made of a voice output, the output of the indications may, for example, occur in succession, so that the user is informed about the display elements represented without focusing on the display unit. In the case of lengthier dwelling, the voice output can also be repeated until the input implement leaves the first input region. If the input implement switches to the second input region, only the voice output corresponding to the first indication, for example, may be reproduced or cyclically repeated. In this way, a user interface can be operated without the user having to direct his/her attention onto the display.

The disclosed method may include a detection of a transfer of the input implement from a part of the second input region assigned to the first display element into a part of the second input region assigned to the second display element. In other words, the user switches, for example, from a region in front of the first display element to a region in front of the second display element, without leaving the first input region. In response thereto, the second additional indication assigned to the second display element can be output, whereas the first additional indication assigned to the first display element is suppressed. The suppressing may generally comprise a "non-output", to the extent that the indication is an item of information that is output cyclically. To the extent that the indication is output permanently, the suppressing may comprise a masking-out or a discontinuance of the output.

The displaying of the additional indications may be undertaken only after a dwelling of the input implement in the respective input region for a minimum period. This can be undertaken using a timer, for example, which is started as soon as the input implement reaches the respective input region for the first time. To the extent that the input implement does not leave the respective input region prior to the elapsing of the timer, the additional indications are output or displayed as described above. This configuration relates to the first input region, as a result of which the start of the disclosed method does not occur in the case of an unintentional (only brief) stay of a hand of the user in the input region.

The detection of the input implement may occur directionally, so that a position of a user relative to the display unit is ascertained. Correspondingly, a content for reproduction by way of additional indication can be selected, depending on the detected position. Alternatively, an output of the respective indication can be suppressed. This may be beneficial, for example, when access to certain functions is not to be permitted to a front-seat passenger as user. Of course, differing functions and corresponding indications for the differing detected positions may also be output.

The screen contents designated as first display elements and second display elements may have been assigned to differing function ranges. For example, a navigation map, an item of destination information pertaining to a route calculation, an outside temperature, an overview relating to air-conditioning/heating settings, seat settings, the image provided by a reversing camera, and/or light settings and/or weather information at the location and/or at the destination and/or media information of the current source, in particular, radio, media, and/or operating indications/tips ("Did you know . . . ?") and/or images, for example, a slideshow and/or calendar information, and/or fuel-saving tips and/or off-road settings may have been assigned to a respective display element. In this way, differing functions can be offered for selection on the display unit at the same time, and the user can be assisted in connection with the control of the functions.

According to a second disclosed embodiment, a display control unit is proposed that comprises a display unit, a control unit and a processing unit. Amongst other things, the display unit has been set up to display elements and indications. The control unit has been set up to detect an input implement in a first input region and in a second input region in front of the display unit. The control unit may include, for example, infrared diodes (LEDs) emitting in the infrared region, and corresponding sensors. In this way, it can detect gestures independently of a contact of the input implement being used, and can relay the gestures to the processing unit for evaluation. The processing unit may include a programmable processor, for example, which is connected to the display unit and to the control unit for data processing. By virtue of the aforementioned components, the display control unit has been set up to implement a method such as has been described above in detail as the first-mentioned embodiment. The features, combinations of features and the benefits resulting from the features and combinations correspond to those described in connection with the first-mentioned embodiment in such a manner that reference is made to the above remarks with a view to avoiding repetition.

The display control unit may be a user interface of a locomotion device. Ordinarily, the corresponding display units have been permanently integrated into the dashboard of the locomotion device. The same may apply to the control unit.

According to a third disclosed embodiment, a locomotion device, in particular, a road-authorized vehicle (for example, an automobile, a truck) is proposed that includes a display control unit according to the second-mentioned embodiment. Also with respect to the features, combinations of features and the benefits resulting from these features and combinations, reference is made to the first-mentioned embodiment.

FIG. 1 shows a vehicle 20 by way of locomotion device, in which there are provided a user interface with a screen 1 by way of display unit, with an array of light-emitting diodes 2 by way of control unit, and with a programmable processor 18 by way of processing unit. The components of the user interface are connected to one another via data lines, to enable the execution of the disclosed method such as will be described in detail in the following in connection with FIGS. 2 to 9.

Figure 2:
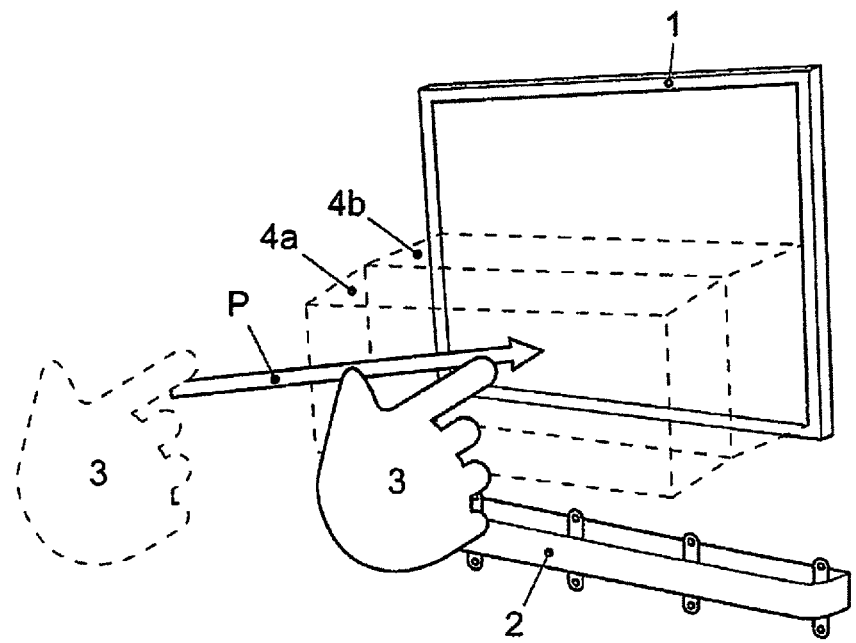
FIG. 2 is a schematic view of an operating step with an exemplary embodiment of the display control unit.

FIG. 2 shows a schematic representation of a user interaction with a display control unit according to an exemplary embodiment. In front of the screen 1 a first input region and a second input region are represented as dashed right parallelepipeds 4a, 4b. Right parallelepiped 4b is arranged directly between the first right parallelepiped 4a and the screen 1. The two right parallelepipeds 4a, 4b consequently adjoin one another directly and seamlessly, whereas the second right parallelepiped 4b exhibits a spacing of between 0 mm and 1 mm from the screen 1. In addition, the hand of a user 3 is represented by way of an input implement, which carries out a movement from a region outside the right parallelepipeds 4a, 4b along an arrow P into right parallelepiped 4a. A stay of the hand 3 is detected by the array of light-emitting diodes 2 below the screen 1 and is relayed to a processing unit (not represented in FIG. 2). In the following, operating steps of the arrangement that is represented will be described in conjunction with the associated screen representations, i.e., screenshots.

Figure 3:
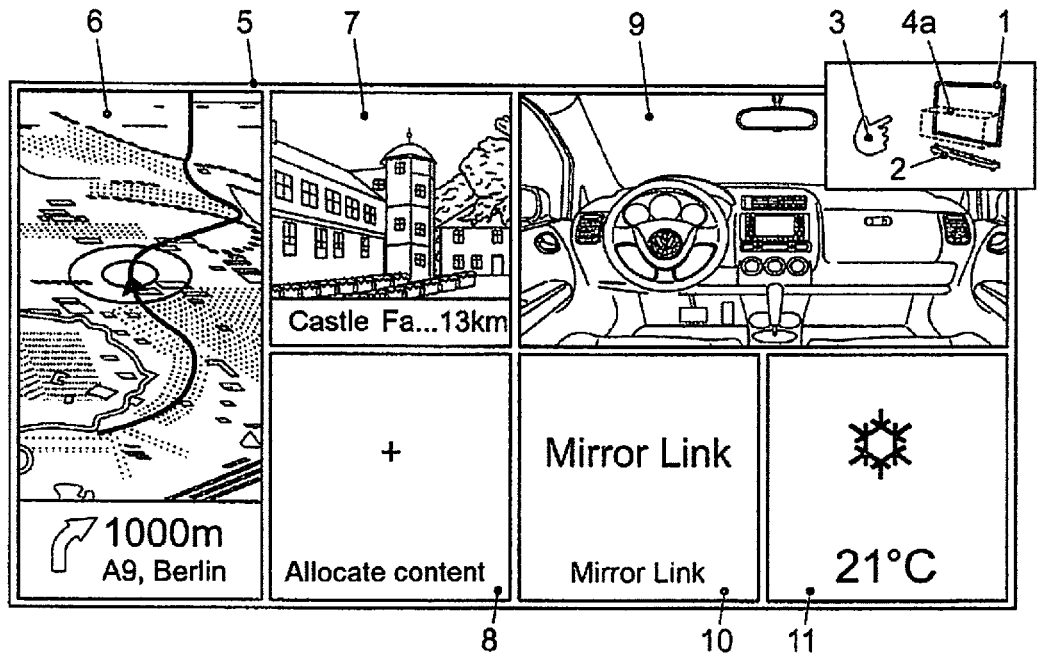
FIGS. 3-8 are diagrams for illustrating operating steps in the course of the execution of the disclosed method.

FIG. 3 shows an application scenario (top right in the picture) in which the hand 3 of the user is located outside an acquisition region 4 in front of the screen 1. The associated screen content 5 has been divided up into six sections 6 to 11, of which a first section displays a map extract 6 of an imminent route, a second section displays information and also a photo 7 relating to a nearby place of interest, a third section displays a representation 9 for visualizing a passenger-compartment configuration, a fourth section as yet displays no content 8, a fifth section displays a rapid access (shortcut) to a menu context in the infotainment system, and a sixth section displays a set internal temperature 11 of the vehicle.

Figure 4:
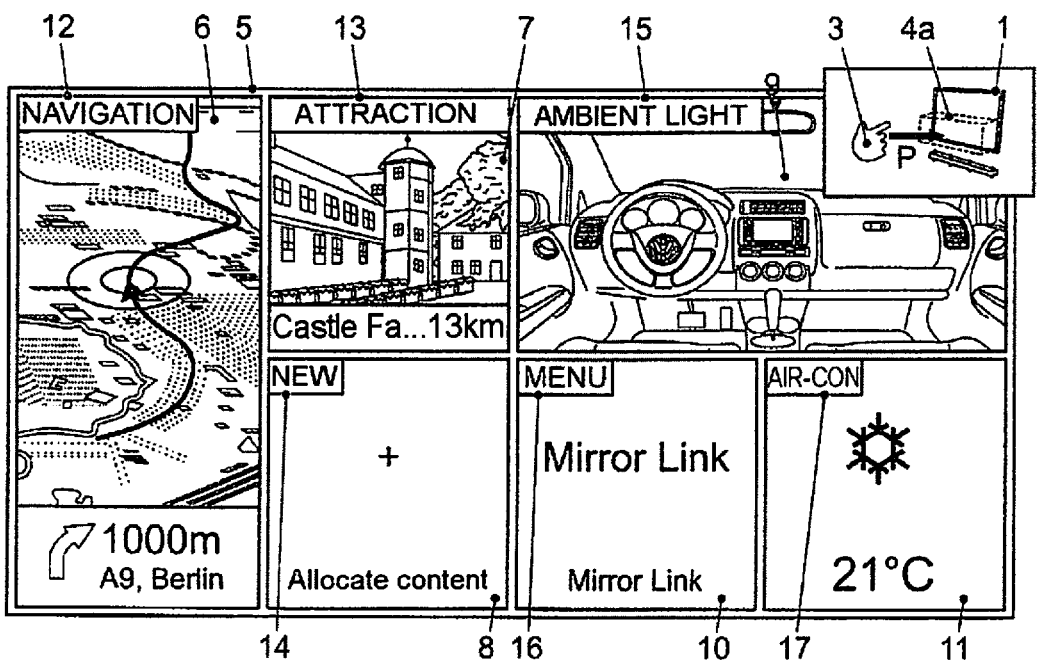

In FIG. 4 the hand 3 of the user is reaching the first input region 4*a* (see the tip of the arrow P). For the purpose of assisting the user, additional indications 12 to 17 are displayed as follows in the sections 6 to 11, discussed above, of the screen representation 5: in an upper left corner of the first section 6 a blue-backed text field 12 with the inscription "Navigation" is displayed. Correspondingly, a text field 13 assigned to the second section 7 has been inscribed with "Attraction". The color of the text fields 12, 13 groups the corresponding information for the user as pertaining to the navigation or route guidance. In the third section 9, when the first input region 4*a* is reached a yellow-backed text field 15 is displayed by way of additional indication in the upper left corner of section 9, the text field bearing the lettering "Ambient light". Corresponding remarks apply to sections 10, 11 arranged below the third section 9, which likewise exhibit yellow-backed text fields 16, 17 and are entitled "Menu" and "Air-con", respectively. The yellow color of the additional indications for the third, fifth and sixth sections 9, 10, 11 groups the information visually as pertaining to a basic vehicle-related information unit. When the first input region 4*a* is reached, the fourth section 8 has in fact gained an additional indication, i.e., a text field 14 with the wording "New". However, since no visual grouping can yet be performed, text field 14 is as yet gray-backed.

Figure 5:
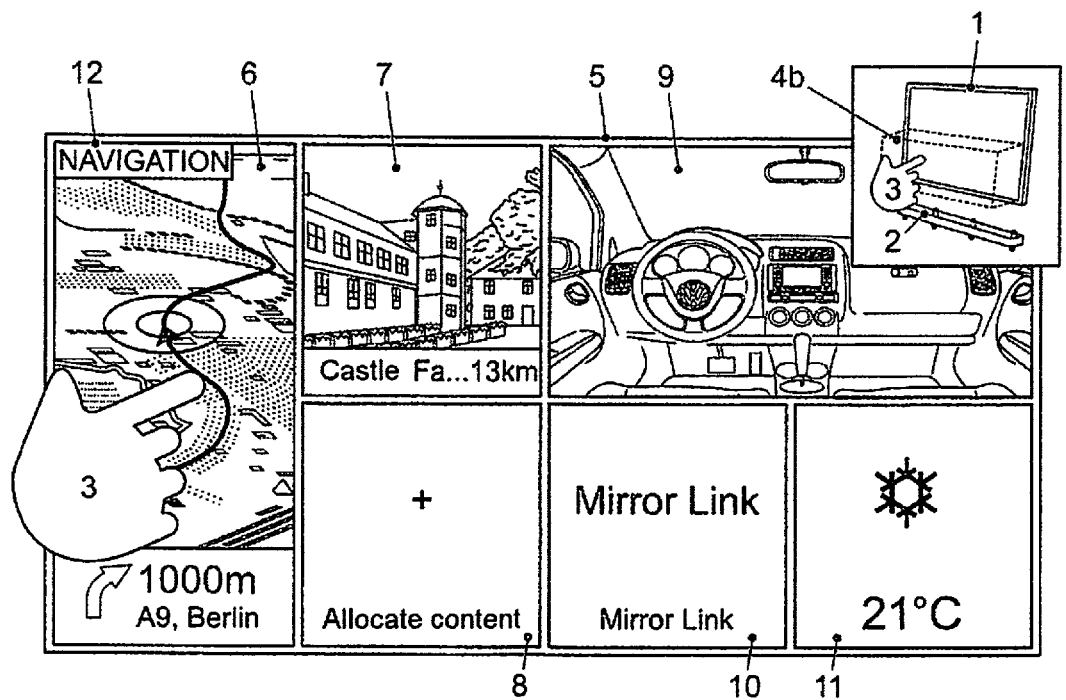

FIG. 5 shows an operating step when second input region 4*b* is reached by the hand 3 of the user. The hand 3 of the user has now arrived at a short distance in front of the first section 6 of the screen display 5. The additional indication, i.e., text field 12, is displayed as before. The remaining additional indications 13 to 17, on the other hand, have been masked out, to intensify the focus on the navigation map. At the same time, it is also made clear to the user that temporally successive inputs always relate to the first section 6 or to a function associated with it. In the operating step that is represented, the user has the possibility to perform a touch gesture (clicking on the display unit 1 in the region of the first section 6) or a switch to a second section 7 or a fifth section 8.

Figure 6:
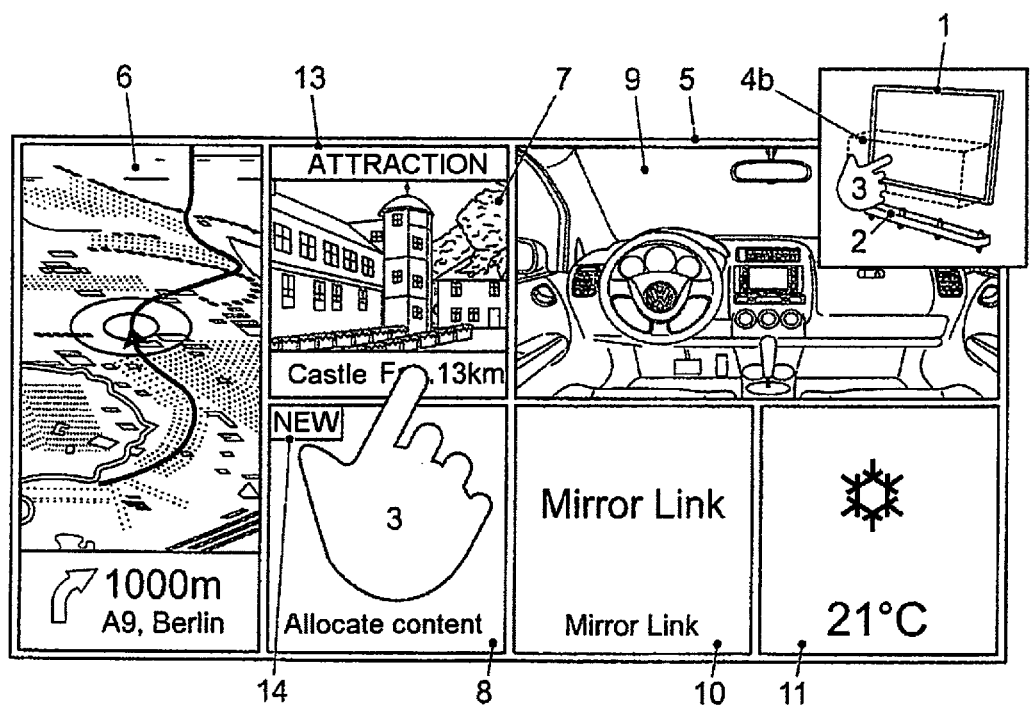

In the example represented in FIG. 6, the user selects the first option by transferring his/her hand 3 from the part of the second input region 4*b* assigned to the first section 6 into a part of input region 4*b* assigned to the second section 7. In response thereto, the output of the second indication, i.e., text field 13 is performed, whereas the output of text field 12 is suppressed.

Figure 7:
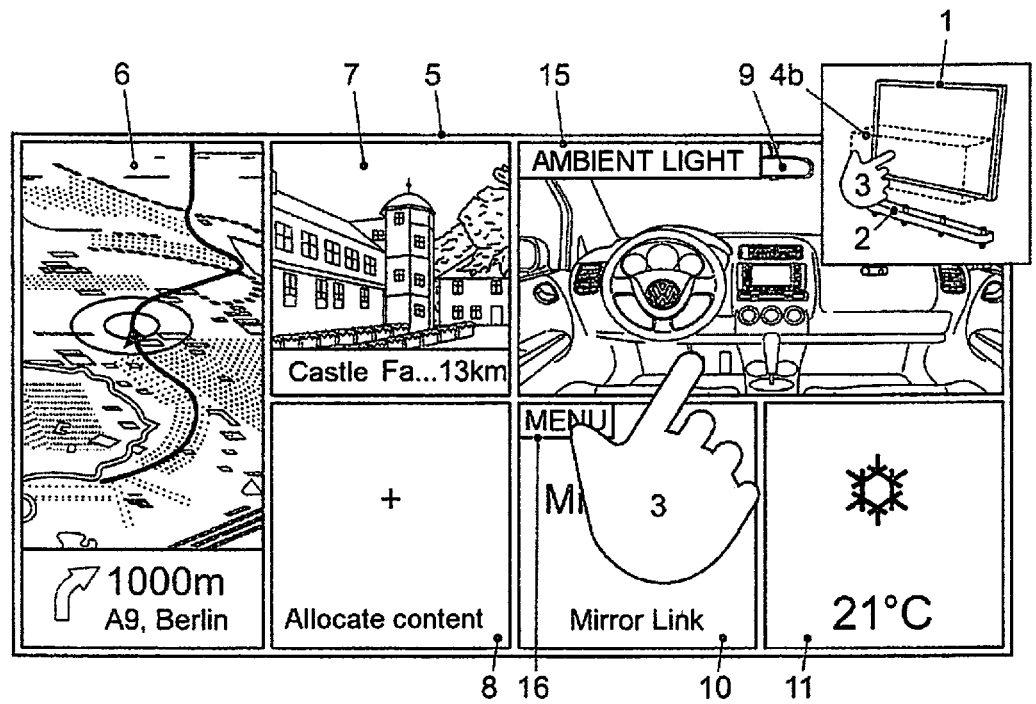

Correspondingly, the user transfers his/her hand 3 in FIG. 7 into two sub-regions of the second input region 4*b* that assigned to the third section 9 and to the fifth section 10. In response thereto, the assigned additional indications are displayed as the text fields 15, 16, whereas the output of text field 13 in the second section 7 is now also revoked or suppressed.

Figure 8:
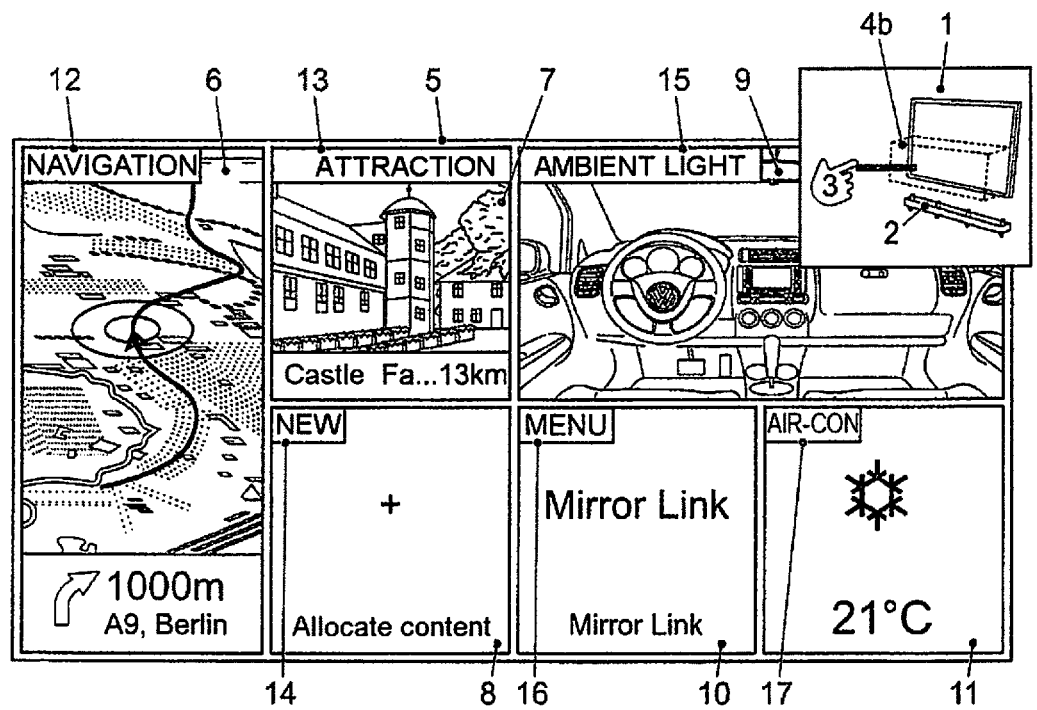

In FIG. 8 the user removes his/her hand 3 from the second input region 4*b* by increasing the spacing of his/her hand 3 from the screen 1. In this way, he/she traverses the first input region 4*a*, in response to which all the additional indications 12 to 17 are displayed again or continuously. In this way, the user is given a feedback concerning the fact that his/her input is not being assigned to any particular functional region on the screen representation 5.

Figure 9:
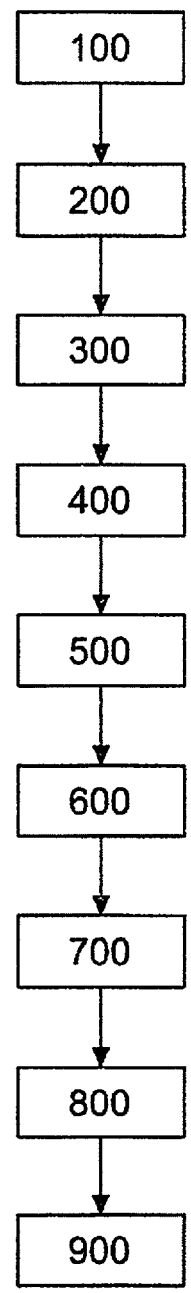
FIG. 9 is a flow chart illustrating steps of an exemplary embodiment of the disclosed method.

FIG. 9 shows a flow chart illustrating steps of an exemplary embodiment of the disclosed method. In step 100, an input implement is detected in a first input region in front of the display unit. In addition, in step 200 a presumed position of a user of the input implement relative to the display unit or relative to the array of light-emitting diodes is detected. In this connection, in an exemplary embodiment it is classified whether the user is the driver or the front-seat passenger of a vehicle. In step 300, a content for a first indication is selected, depending on the classified position. To the extent that the position has been assigned to the driver of the vehicle, more extensive access rights can be assigned, or more indications of available functions can be represented, than if the front-seat passenger had been ascertained as user. In step 400, a first indication relating to a first display element and a second indication relating to a second display element are output. The user is informed about these indications via the functions available for selection. If the user selects one of the functions for closer inspection by approximating his/her hand to the display unit, in step 500 the hand is detected as an input implement in a second input region in front of the display unit. In response thereto, in step 600 all the additional indications, with the exception of the indication pertaining to the first display element, are suppressed or no longer output. In step 700, a transfer of the input implement from a part of the second input region assigned to the first display element into a part of the second input region assigned to the second display element is subsequently detected. In other words, in step 700 the user moves his/her hand out of a region in front of a first section into a region in front of a second, adjacent section, without his/her hand leaving the second input region. In step 800, in response thereto a second indication relating to the second display element is output. In other words, it is detected that the focus of the user is now on the second display element, for which reason in step 900 the output of the first indication relating to the first display element is suppressed. In this way, the disclosed embodiments enable a support of a respective focus on a display unit.

Even though the disclosed embodiments have been described in detail on the basis of the appended figures of the drawing, modifications and combinations of features of the exemplary embodiments represented are possible for a person skilled in the art without departing from the scope of the disclosure.

LIST OF REFERENCE SYMBOLS

1 screen
2 control unit
3 hand
4 input region
4*a* first input region (right parallelepiped)
4*b* second input region (right parallelepiped)
5 screen content
6,7,8, sections
9,10,11
12,13,14, additional indications, text fields
15,16,17
18 processor
20 automobile
100-900 method steps
P arrow

The invention claimed is:

1. A method for displaying additional indications relating to display elements displayed on a display unit having a display screen in a vehicle, the method comprising:

detecting by infrared emission sensors an input implement in a first input region in front of the display unit having the display elements shown thereon and, in response thereto, outputting a first indication relating to a first display element and a second indication relating to a second display element; and further detecting by the sensors the input implement in a second input region in front of the display unit having the display elements, the first indication and second indication displayed thereon and, in response thereto, suppressing the second indication relating to the second display element, wherein the first indication continues to be displayed;

further detecting by contact of the input implement with the display screen a third input by which a selection associated with the first indication can be made;

detecting a position of a user of the input implement relative to the display unit; and displaying functions and providing rights to the user based on whether the position of the user is that of a driver or a passenger;

wherein a spacing of the first input region from the display unit is greater than a spacing of the second input region from the display unit, and wherein a spacing of the second input region from the display unit is greater than 0 mm.

2. The method of claim 1, wherein the indication comprises at least one of a symbol, a text and a voice output.

3. The method of claim 1, further comprising:
detecting a transfer of the input implement from a part of the second input region assigned to the first display element into a part of the second input region assigned to the second display element and in response thereto, outputting the second indication relating to the second display element and suppressing the first indication relating to the first display element.

4. The method of claim 1, wherein the displaying of the first indication and of the second indication occurs only after a dwelling of the input implement in the first input region or second input region for a minimum period.

5. The method of claim 1, further comprising:
detecting a position of a user of the input implement relative to the display unit; and
selecting a content suppressing the first indication and the second indication, or both depending on the position.

6. The method of claim 1, wherein at least one of the first display element and the second display element has/have each been assigned to differing function ranges from the list comprising:
navigation map,
destination information,
outside temperature,
air-conditioning/heating settings,
seat settings,
reversing camera,
light settings,
weather information at the location,
weather information at the destination,
media information of the current source, in particular radio, media,
operating indications/tips,
images, slideshow,
calendar information,
fuel-saving tips,
off-road settings.

7. A display control unit in a vehicle comprising:
a display unit having a display screen;
a control unit; and
a processing unit,
wherein the display unit displays indications and display elements,
wherein the control unit detects by infrared emission sensors an input implement in at least one of a first input region and a second input region in front of the display unit, and
wherein the processing unit is connected to the display unit and to the control unit, and the display control unit executes a method comprising:
detecting by the sensors an input implement in the first input region in front of the display unit having the display elements shown thereon and, in response thereto, outputting a first indication relating to a first display element and a second indication relating to a second display element; and
further detecting by the sensors the input implement in the second input region in front of the display unit having the display elements, the first indication and second indication displayed thereon and, in response thereto, suppressing the second indication relating to the second display element, wherein the first indication continues to be displayed;
further detecting by contact of the input implement with the display screen a third input by which a selection associated with the first indication can be made; and
detecting a position of a user of the input implement relative to the display unit; and
displaying functions and providing rights to the user based on whether the position of the user is that of a driver or a passenger;
wherein a spacing of the first input region from the display unit is greater than a spacing of the second input region from the display unit, and wherein a spacing of the second input region from the display unit is greater than 0 mm.

8. The display control unit of claim 7, wherein the display control unit is a user interface of a locomotion device.

9. The display control unit of claim 7 wherein the indication comprises at least one of a symbol, a text and a voice output.

10. The display control unit of claim 7 wherein the method executed by the display control unit further comprises:
detecting a transfer of the input implement from a part of the second input region assigned to the first display element into a part of the second input region assigned to the second display element and in response thereto, outputting the second indication relating to the second display element and suppressing the first indication relating to the first display element.

11. The display control unit of claim 7 wherein the displaying of the first indication and of the second indication occurs only after a dwelling of the input implement in the first input region or second input region for a minimum period.

12. The display control unit of claim 7 wherein the method executed by the display control unit further comprises:
detecting a position of a user of the input implement relative to the display unit; and
selecting a content, suppressing the first indication and the second indication, or both, depending on the position.

13. The display control unit of claim 7 wherein at least one of the first display element and the second display element has been assigned to differing function ranges from the list comprising:
  navigation map,
  destination information,
  outside temperature,
  air-conditioning/heating settings,
  seat settings,
  reversing camera,
  light settings,
  weather information at the location;
  weather information at the destination,
  media information of the current source, in particular radio, media,
  operating indications/tips,
  images, slideshow,
  calendar information,
  fuel-saving tips,
  off-road settings.

14. A vehicle including a display control unit comprising:
  a display unit having a display screen;
  a control unit; and
  a processing unit,
  wherein the display unit displays indications and display elements,
  wherein the control unit detects by infrared emission sensors an input implement in at least one of a first input region and a second input region in front of the display unit, and
  wherein the processing unit is connected to the display unit and to the control unit, and the display control unit executes a method comprising:
  detecting by the sensors an input implement in the first input region in front of the display unit having the display elements shown thereon and, in response thereto, outputting a first indication relating to a first display element and a second indication relating to a second display element; and
  further detecting by the sensors the input implement in the second input region in front of the display unit having the display elements, the first indication and second indication displayed thereon and, in response thereto, suppressing the second indication relating to the second display element, wherein the first indication continues to be displayed;
  further detecting by contact of the input implement with the display screen a third input by which a selection associated with the first indication can be made; and
  detecting a position of a user of the input implement relative to the display unit; and
  displaying functions and providing rights to the user based on whether the position of the user is that of a driver or a passenger;
  wherein the first indication continues to be displayed, and wherein a spacing of the first input region from the display unit is greater than a spacing of the second input region from the display unit, and wherein a spacing of the second input region from the display unit is greater than 0 mm.

15. The vehicle of claim 14 wherein the indication comprises at least one of a symbol, a text and a voice output.

16. The vehicle of claim 14 wherein the method executed by the display control unit further comprises:
  detecting a transfer of the input implement from a part of the second input region assigned to the first display element into a part of the second input region assigned to the second display element and in response thereto, outputting the second indication relating to the second display element and suppressing the first indication relating to the first display element.

17. The vehicle of claim 14 wherein the displaying of the first indication and of the second indication occurs only after a dwelling of the input implement in the first input region or second input region for a minimum period.

18. The vehicle of claim 14 wherein the method executed by the display control unit further comprises:
  detecting a position of a user of the input implement relative to the display unit; and
  selecting a content, suppressing the first indication and the second indication, or both, depending on the position.

19. The vehicle of claim 14 wherein at least one of the first display element and the second display element has been assigned to differing function ranges from the list comprising:
  navigation map,
  destination information,
  outside temperature,
  air-conditioning/heating settings,
  seat settings,
  reversing camera,
  light settings,
  weather information at the location;
  weather information at the destination,
  media information of the current source, in particular radio, media,
  operating indications/tips,
  images, slideshow,
  calendar information,
  fuel-saving tips,
  off-road settings.

* * * * *